United States Patent
Ko et al.

(10) Patent No.: US 10,522,872 B2
(45) Date of Patent: Dec. 31, 2019

(54) POLYMER ELECTROLYTE HAVING MULTI-LAYER STRUCTURE, AND ALL-SOLID BATTERY COMPRISING SAME

(71) Applicant: LG CHEM, LTD., Seoul (KR)

(72) Inventors: Dong Wook Ko, Daejeon (KR); Doo Kyung Yang, Daejeon (KR); Eun Kyung Park, Daejeon (KR); Jong Hyun Chae, Daejeon (KR)

(73) Assignee: LG CHEM, LTD., Seoul (KR)

( * ) Notice: Subject to any disclaimer, the term of this patent is extended or adjusted under 35 U.S.C. 154(b) by 118 days.

(21) Appl. No.: 15/572,851

(22) PCT Filed: Oct. 28, 2016

(86) PCT No.: PCT/KR2016/012283
§ 371 (c)(1),
(2) Date: Nov. 9, 2017

(87) PCT Pub. No.: WO2017/074116
PCT Pub. Date: May 4, 2017

(65) Prior Publication Data
US 2018/0159169 A1   Jun. 7, 2018

(30) Foreign Application Priority Data

Oct. 30, 2015 (KR) .................. 10-2015-0151630
Oct. 28, 2016 (KR) .................. 10-2016-0141786

(51) Int. Cl.
*H01M 6/18*    (2006.01)
*H01M 10/056*    (2010.01)
*H01M 10/052*    (2010.01)

(52) U.S. Cl.
CPC ....... *H01M 10/056* (2013.01); *H01M 10/052* (2013.01); *H01M 2300/0082* (2013.01); *H01M 2300/0094* (2013.01)

(58) Field of Classification Search
CPC ............. H01M 2/1653; H01M 2/1686; H01M 10/056; H01M 10/052; H01M 10/0525;
(Continued)

(56) References Cited

U.S. PATENT DOCUMENTS 6,576,371 B1   6/2003 Yasuda et al.
9,680,181 B2   6/2017 Rhee et al.
(Continued)

FOREIGN PATENT DOCUMENTS

CN    101124693 A    2/2008
CN    101897071 A    11/2010
(Continued)

OTHER PUBLICATIONS

International Search Report. issued in PCT/KR2016/012283, dated Feb. 1, 2017.
(Continued)

*Primary Examiner* — Raymond Alejandro
(74) *Attorney, Agent, or Firm* — Birch, Stewart, Kolasch & Birch, LLP

(57) ABSTRACT

A polymer electrolyte for an all-solid battery, having a multi-layer structure is provided. An embodiment of the polymer electrolyte is a polymer electrolyte having a multi-layer structure, which includes a first polymer electrolyte layer and a second polymer electrolyte layer, where the EO:Li molar ratio of a poly(ethylene oxide)(PEO)-based polymer and a lithium salt is different between the first and second polymer electrolyte layers is provided. A solid polymer electrolyte of the present invention in the all-solid battery substantially reduces the interfacial resistance with lithium and the discharge overvoltage, resulting in a sufficient discharge capacity, which improves output characteristics and energy density.

9 Claims, 2 Drawing Sheets

(58) Field of Classification Search
CPC ..... H01M 10/0565; H01M 2300/0082; H01M 2300/0094
See application file for complete search history.

(56) References Cited

U.S. PATENT DOCUMENTS

| | | |
|---|---|---|
| 2003/0104273 A1 | 6/2003 | Lee et al. |
| 2009/0104537 A1 | 4/2009 | Deschamps |
| 2009/0162754 A1* | 6/2009 | Cotton ................ H01M 10/052 429/309 |
| 2009/0317724 A1 | 12/2009 | Kumar et al. |
| 2012/0094189 A1 | 4/2012 | Scrosati et al. |
| 2012/0315547 A1 | 12/2012 | Itoh et al. |
| 2014/0030607 A1 | 1/2014 | Noguchi |
| 2015/0244025 A1* | 8/2015 | Rhee ....................... C08L 71/02 429/307 |
| 2016/0006075 A1 | 1/2016 | Tabuchi et al. |

FOREIGN PATENT DOCUMENTS

| | | |
|---|---|---|
| JP | 5-298915 A | 11/1993 |
| JP | 2004-206942 A | 7/2004 |
| JP | 3640863 B2 | 4/2005 |
| JP | 4560721 B2 | 10/2010 |
| JP | 5382536 B2 | 1/2014 |
| JP | 2014-43467 A | 3/2014 |
| JP | 2014-49326 A | 3/2014 |
| JP | 5548937 B2 | 7/2014 |
| JP | 5588128 B2 | 9/2014 |
| JP | 5664865 B2 | 2/2015 |
| KR | 10-0125151 B1 | 12/1997 |
| KR | 10-0658546 B1 | 12/2006 |
| KR | 10-2010-0098548 A | 9/2010 |
| KR | 10-1107731 B1 | 1/2012 |
| KR | 10-2012-0092918 A | 8/2012 |
| KR | 10-2013-0042513 A | 4/2013 |
| KR | 10-2014-0082042 A | 7/2014 |
| KR | 10-1439716 B1 | 9/2014 |
| KR | 10-2015-0101235 A | 9/2015 |
| KR | 10-2015-0122148 A | 10/2015 |
| WO | WO 2011/068389 A2 | 6/2011 |

OTHER PUBLICATIONS

Ohta et al., "$LiNbO_3$-coated $LiCoO_2$ as cathode material for all sad-state lithium secondary batteries", Electrochemistry Communications, 2007, vol. 9. pp. 1486-1490.

Qian et al., "High rate and stable cycling of lithium meta anode", Nature communications, 2015, vol. 6. pp. 1-9.

Tominaga et al., "Fast Li-ion conduction in poly(ethylene carbonate)-based electrolytes and composites filled with $TiO_2$ nanoparticles", Chem.Commun., 2014, vol. 50, pp. 4448-4450.

Zhang et al., "Lithium bis(fluorosulfonyl)imide/poly(ethyiena oxide) polymer electrolyte", Electrochimica Acta, 2014, vol. 133, pp. 529-538.

Extended European Search Report, dated Nov. 19, 2018, for European Application No. 16860299.3.

* cited by examiner

POLYMER ELECTROLYTE HAVING MULTI-LAYER STRUCTURE, AND ALL-SOLID BATTERY COMPRISING SAME

TECHNICAL FIELD

This application claims priority to and the benefits of Korean Patent Application No. 10-2015-0151630, filed with the Korean Intellectual Property Office on Oct. 30, 2015, and Korean Patent Application No. 10-2016-0141786, filed with the Korean Intellectual Property Office on Oct. 28, 2016, the entire contents of which are incorporated herein by reference.

The present invention relates to a polymer electrolyte with a multi-layer structure for an all-solid-state battery and, more particularly, to a polymer electrolyte having a multi-layer structure, which comprises a first polymer electrolyte layer and a second polymer electrolyte layer, wherein the EO:Li molar ratio of a polyethylene oxide) (PEO)-based polymer and a lithium salt is different between the first and second polymer electrolyte layers.

BACKGROUND ART

In recent years, the demand for secondary batteries has increased in various applications as power sources for PCs, video cameras, cellular phones, and the like, or as power sources for electric vehicles and power storage media. Among secondary batteries, particularly lithium-based secondary batteries have higher capacity density than other secondary batteries and can operate at higher voltages, and thus are used for information-related devices or communication devices as secondary batteries for miniaturization and light weight. Recently, the development of high power and high capacity lithium-based secondary batteries for electric vehicles or hybrid vehicles is underway.

A typical lithium-based secondary battery consists of a positive electrode (cathode), a negative electrode (anode) and an electrolyte containing lithium salt interposed therebetween, and this electrolyte may be a non-aqueous liquid electrolyte or a solid electrolyte. When the non-aqueous liquid electrolyte is used as an electrolyte, since the electrolyte penetrates into the positive electrode, it is easy to form an interface between the positive electrode active material constituting the positive electrode and the electrolyte, and accordingly, the electrical performance is high.

However, since the lithium-based secondary battery uses a flammable organic solvent in the liquid electrolyte, in order to prevent ignition or rupture that may occur due to over current caused by short, it may be necessary to install a safety device. In addition, in order to prevent such a phenomenon, there are cases where the selection of the battery material or the design of the battery structure is restricted.

Therefore, the development of an all-solid battery using a solid electrolyte instead of a liquid electrolyte has been underway. Since the all-solid battery does not contain a flammable organic solvent, the all-solid battery has the advantage of simplifying the safety device and thus is recognized as a superior battery in terms of manufacturing cost or productivity. In addition, since it is easy to laminate, in series, a pair of electrode layers including a positive electrode (cathode) layer and a negative electrode (anode) layer, and a junction structure including a solid electrolyte layer lying between these electrode layers, the all-solid battery is expected to be a technology capable of producing a high-capacity and high-output battery with stability.

On the other hand, it is known that, in the all-solid battery, the contact resistance between the particles of the active material particles responsible for the cell reaction or between the active material particles and the solid electrolyte particles greatly affects the internal resistance of the battery. Particularly, as the volume change of the active material due to repetition of charging and discharging occurs, the contactability between the active material and the solid electrolyte or the conductive material is reduced, and there is a tendency that an increase in internal resistance or a decrease in capacity or the like occurs easily. Accordingly, various techniques which improve contactability between particles of the active material or the solid electrolyte, and suppress an increase in internal resistance and the like have been proposed.

For example, there is an attempt to improve the performance of the all-solid battery by paying attention to the interface between the positive electrode active material and the solid electrolyte material. For example, in a research paper by Narumi Ohta et al. ("$LiNbO_3$-coated $LiCoO_2$ as cathode material for all solid-state lithium secondary batteries", Electrochemistry Communications 9 (2007), 1486-1490), $LiNbO_3$ (lithium niobate) is described as a material to be coated on the surface of $LiCoO_2$ (positive electrode active material). This technique aims to obtain a high-power battery in such a manner that the surface of the $LiCoO_2$ is coated with $LiNbO_3$ to suppress the reaction between $LiCoO_2$ and the solid electrolyte material, thereby reducing the interfacial resistance between $LiCoO_2$ and the solid electrolyte material.

In addition, when the negative electrode active material reacts with the solid electrolyte material, a high resistance portion is generally formed on the surface of the negative electrode active material, thereby increasing the interfacial resistance between the negative electrode active material and the solid electrolyte material. In order to resolve this problem, Japanese Laid-Open Patent Publication No. 2004-206942 discloses an all-solid battery wherein a second solid electrolyte layer, which does not chemically react with the first solid electrolyte and has lower ion conductivity than the first solid electrolyte layer (sulfide based solid electrolyte material), is formed between the first solid electrolyte layer and a negative electrode made of metal lithium. This application attempts to inhibit the reaction between the first solid electrolyte layer and the metal lithium through formation of the second solid electrolyte layer with low ion conductivity.

However, attempts to improve the performance of the all-solid battery have failed to adequately lower the interfacial resistance between the positive electrode or negative electrode active material and the solid electrolyte material, thereby making them unsuitable for manufacturing high power and high capacity batteries.

PRIOR ART LITERATURE

Patent Literature

Patent Document 1: Korean Laid-Open Patent Publication No. 2002-0092918, entitled "Polymer composite electrolyte for lithium secondary battery and lithium secondary battery comprising same."

Patent Document 2: Japanese Laid-Open Patent Publication No. 2004-206942, entitled "All-solid lithium battery."

Non-Patent Document

Non-Patent Document 1: Qian, Jiangfeng, et al. "High rate and stable cycling of lithium metal anode." Nature communications 6 (2015).

Non-Patent Document 2: "LiNbO3-coated LiCoO2 as cathode material for all solid-state lithium secondary batteries", Electrochemistry Communications 9 (2007), 1486-1490.

DISCLOSURE

Technical Problem

The all-solid battery to which a solid polymer electrolyte was applied is difficult to exhibit sufficient output or capacity even at room temperature, as well as at 60° C. or 80° C. For this reason, first, the low ionic conductivity of the polymer electrolyte and second, the interfacial resistance between lithium and the polymer electrolyte can be mentioned. Many efforts have been made to solve the ion conductivity of the polymer electrolyte in the interim, but there was no remarkable improvement in ion conductivity and it has been pointed out as a limitation of the solid polymer electrolyte.

On the other hand, according to the prior literature, it has been reported that in batteries using a liquid electrolyte and lithium metal, a high concentration of electrolyte has low reactivity and also low interface resistance with lithium (Qian, Jiangfeng, et al. "High rate and stable cycling of lithium metal anode." Nature communications 6 (2015)).

The present inventors, in view of this, have come to complete the present invention by applying a polymer electrolyte using a high concentration of lithium salt to the all-solid battery to lower the interfacial resistance between lithium and the solid polymer electrolyte.

Therefore, the purpose of the present invention is to provide a polymer electrolyte for the all-solid battery, which significantly reduces the interfacial resistance between lithium and the polymer electrolyte.

Technical Solution

The present invention provides a polymer electrolyte with multi-layer structure for an all-solid battery, which comprises a first polymer electrolyte layer having a molar ratio of EO:Li of poly (ethylene oxide) (PEO)-based polymer and lithium salt of 1:1 to 7:1; and a second polymer electrolyte layer having a molar ratio of EO:Li of poly (ethylene oxide)-based polymer and lithium salt of 8:1 to 30:1.

At this time, the thickness of the first polymer electrolyte layer may be 1 to 5 μm.

At this time, the thickness of the second polymer electrolyte layer may be 5 to 50 μm.

At this time, the weight average molecular weight (Mw) of the poly (ethylene oxide)-based polymer may be 1,000,000 to 8,000,000.

At this time, the lithium salt may include one selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, LiSCN, LiC(CF$_3$SO$_2$)$_3$, (CF$_3$SO$_2$)$_2$NLi, (FSO$_2$)$_2$NLi, chloroborane lithium, lithium lower aliphatic carboxylate, lithium tetraphenylborate, lithium imide, and combinations thereof.

At this time, the second polymer electrolyte layer may be crosslinked by a crosslinking monomer to form semi-Interpenetrating Polymer Networks (semi-IPN).

At this time, the crosslinking monomer may contain —(CH$_2$—CH$_2$—O)— repeating units.

At this time, the crosslinking monomer may contain 2 to 8 alkylenic unsaturated bonds at the terminals.

At this time, the crosslinking monomer may be contained in an amount of 5 to 50 wt. % relative to the poly (ethylene oxide)-based polymer and lithium salt.

The present invention also provides an all-solid battery comprising a positive electrode, a negative electrode and a solid polymer electrolyte interposed therebetween, characterized in that the solid polymer electrolyte is the polymer electrolyte with the multi-layer structure for the all-solid battery.

At this time, the first polymer electrolyte layer may be disposed facing the negative electrode.

Advantageous Effects

When the solid polymer electrolyte of the present invention is applied to the all-solid battery, the interfacial resistance with lithium and the discharge overvoltage are significantly reduced, thereby resulting in sufficient discharge capacity and improving output characteristics and energy density.

MODE FOR DISCLOSURE

Figure 1:
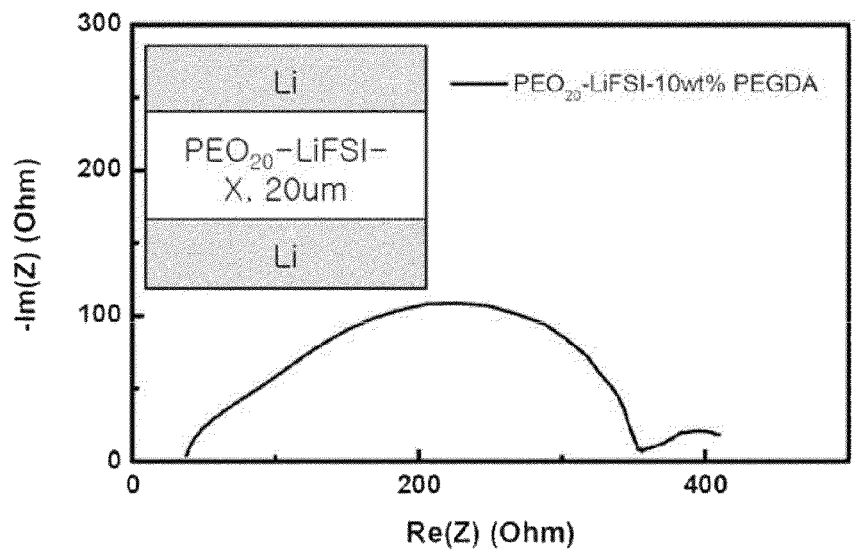
FIG. 1 is a graph showing the interfacial resistance of the lithium symmetric cell according to Comparative Example 1.

The polymer electrolyte of the present invention applicable to the all-solid battery as the lithium secondary battery is a polymer electrolyte with a multilayer structure, comprising a first polymer electrolyte layer and a second polymer electrolyte layer which include poly (ethylene oxide) (PEO)-based polymer and lithium salt and are different in EO:Li molar ratios of the poly (ethylene oxide)-based polymer and lithium salt. Hereinafter, the polymer electrolyte of the present invention will be described in detail for each component.

First Polymer Electrolyte Layer

In the present invention, the first polymer electrolyte layer is applied to lower the interfacial resistance and is prepared by selecting the molar ratio of EO:Li of poly (ethylene oxide)-based polymer and lithium salt within the range of 1:1 to 7:1. As described above, when lithium salt is doped at a high ratio and accordingly thinned to a thickness of 1 to 5 μm, the ionic conductivity is somewhat lowered, but the interfacial resistance can be significantly lowered.

Second Polymer Electrolyte Layer

In the present invention, the second polymer electrolyte layer is applied to prevent the phenomenon due to the generation of dendrite by increasing the mechanical strength, and is prepared by selecting the molar ratio of EO:Li of poly (ethylene oxide)-based polymer and lithium salt within the range of 8:1 to 30:1. At this time, the thickness of the second polymer electrolyte layer may be 5 to 50 μm.

Also, the second polymer electrolyte layer may be crosslinked by a crosslinking monomer to form a semi-Interpenetrating Polymer Networks (hereinafter, referred to as semi-IPN) structure. This semi-IPN structure can increase the strength of the solid polymer electrolyte and, as the strength is high, the generation of lithium dendrite on the surface of the electrode can be physically suppressed. At this time, when the weight average molecular weight (Mw) of the poly (ethylene oxide)-based polymer is applied in a relatively high molecular weight in the range of 1,000,000 to 8,000,000, a more compact semi-IPN structure can be formed.

It is preferable that as a crosslinking monomer, a polyfunctional monomer having two or more functional groups can be used, and such monomer preferably contains —($CH_2$—$CH_2$—O)— repeating units and polymerizable alkylenic unsaturated bonds in the range of 2 to 8 at both terminals. The alkylenic unsaturated bond is a hydrocarbon group containing at least one carbon-carbon double bond or triple bond, and includes, but not limited to, ethenyl group, 1-propenyl group, 2-propenyl group, 2-methyl-1-propenyl group, 1-butenyl group, 2-butenyl group, ethynyl group, 1-propynyl group, 1-butynyl group, 2-butynyl group and the like. These alkylenic unsaturated bonds act as crosslinking points to crosslink the poly (ethylene oxide)-based polymer through a polymerization process, thereby forming a semi-IPN structure.

For example, the crosslinking monomer may be selected from the group consisting of polyethylene glycol diacrylate (PEGDA), polyethylene glycol dimethacrylate (PEGDMA), poly (propylene glycol) diacrylate: PPGDA), poly (propylene glycol) dimethacrylate (PPGDMA), and combinations thereof, and preferably, polyethylene glycol diacrylate (PEGDA) can be used.

Also, the crosslinking monomer is preferably contained in an amount of 5 to 50 wt. % relative to the weight of the poly (ethylene oxide)-based polymer to form a semi-IPN structure meeting the object of the present invention.

There is no particular limitation on the method of crosslinking the crosslinking monomer between the poly (ethylene oxide)-based polymers, but preferably the crosslinking monomer can be crosslinked while maintaining a proper temperature condition after adding a thermal initiator. At this time, it is possible to apply benzoyl peroxide (BPO) or azobisisobutyronitrile (AIBN) as a thermal initiator.

The lithium salt, which is commonly applied to the first polymer electrolyte layer and the second polymer electrolyte layer according to the present invention, can be dissociated into lithium ions and can permeate into the first polymer electrolyte layer and the second polymer electrolyte layer to move freely. At this time, the basic operation of the lithium battery is possible by the source of lithium ions, and these lithium salts can be used as long as they are commonly used in lithium batteries, and preferably, the lithium salt includes LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, LiSCN, $LiC(CF_3SO_2)_3$, $(CF_3SO_2)_2NLi$, $(FSO_2)_2NLi$, chloroborane lithium, lithium lower aliphatic carboxylate, lithium tetraphenylborate, lithium imide, and combinations thereof, and more preferably, lithium bis(fluorosulfonyl) imide (LiFSI) represented by $(FSO_2)_2NLi$ can be used as the lithium salt.

The method of preparing the first polymer electrolyte layer or the second polymer electrolyte layer of the present invention is not limited in the present invention, and the mixing and molding process by the wet or dry method as known in the art may be used. Also, the thickness of the solid polymer electrolyte of the present invention can be selected within the range of 1 to 50 μm.

An all-solid battery comprising the solid polymer electrolyte of the present invention interposed between the positive electrode and the negative electrode is described, wherein the first polymer electrolyte layer faces the negative electrode and the interfacial resistance is significantly reduced.

All-Solid Battery

If the electrode proposed in the present invention is a positive electrode, a positive electrode active material may be used as the electrode active material. If the electrode is a negative electrode, a negative electrode active material may be used as the electrode active material. At this time, each electrode active material may be any active material applied to conventional electrodes, and is not particularly limited in the present invention.

The positive electrode or negative electrode active material used in the present invention varies depending on the type of conducting ions of the all-solid battery intended. For example, if the all-solid battery according to the present invention is an all-solid lithium secondary battery, the positive electrode or negative electrode active material occludes or releases lithium ions. In addition, the positive electrode or negative electrode active material used in the present invention can typically react with the solid electrolyte material described above to form a high-resistance portion.

The positive electrode active material can be varied depending on the usage of the lithium secondary battery, and a known material is used for the specific composition. As an example, such positive electrode active material may be any one of lithium transition metal oxides selected from the group consisting of lithium-phosphate-iron compound, lithium cobalt-based oxide, lithium manganese-based oxide, lithium copper oxide, lithium nickel-based oxide, lithium manganese composite oxide, and lithium-nickel-manganese-cobalt-based oxide. More specifically, among the lithium metal phosphorous oxides represented by $Li_{1+a}M(PO_{4-b})X_b$, the lithium metal phosphorous oxides wherein M is at least one selected from the metals of Groups 2 to 12 and X is at least one selected from F, S and N, $-0.5 \leq a \leq +0.5$, and $0 \leq b \leq 0.1$ are preferable.

At this time, the negative electrode active material can be one selected from the group consisting of lithium metal, lithium alloy, lithium metal composite oxide, lithium containing titanium composite oxide (LTO), and combinations thereof. At this time, the lithium alloy may be an alloy of lithium and at least one metal selected from Na, K, Rb, Cs, Fr, Be, Mg, Ca, Sr, Ba, Ra, Al and Sn. Also, the lithium metal composite oxide may be a lithium metal composite oxide made of lithium and any one metal (Me) oxide ($MeO_x$) selected from the group consisting of Si, Sn, Zn, Mg, Cd, Ce, Ni and Fe, and as an example, may be $Li_xFe_2O_3$ ($0 < x \leq 1$) or $LixWO_2$ ($0 < x \leq 1$).

At this time, if necessary, the conducting material, the polymer electrolyte, the binder, or the filler, etc. may be further added in addition to the active material conductive material, the conducting material is not particularly limited as long as it has electrical conductivity without causing a chemical change in the relevant battery, and for example, graphite; carbon black such as carbon black, acetylene black, ketjen black, channel black, furnace black, lamp black, and summer black; conductive fibers such as carbon fiber and metal fiber; metal powders such as carbon fluoride, aluminum, and nickel powder; conductive whisker such as zinc oxide and potassium titanate; conductive metal oxide such as titanium oxide; and conductive materials such as polyphenylene derivatives can be used. Specific examples of commercially available conductive materials include acetylene black based products of Chevron Chemical Company products or Denka products (Singapore Private Limited), Gulf Oil Company products, Ketjenblack, EC series Armak Company products, Vulcan XC-72 Cabot Company products and Super P (Timcal Company products).

The binder is a component that assists in binding of the active material and the conductive material etc. and binding to the current collector, and is usually added in an amount of 1 to 50 wt. % based on the total weight of the mixture containing the electrode active material. An example of such binders includes polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butylene rubber, fluorine rubber, various copolymers and the like.

The filler is not particularly limited as long as it is a fibrous material without causing chemical change in the relevant battery, and for example, include olefinic polymers such as polyethylene, polypropylene and the like; and fibrous materials such as glass fibers, carbon fibers and the like.

During charging/discharging operations of the battery, a high resistance portion is created at the interface between the electrode active material and the solid a polymer electrolyte material. Accordingly, when the first polymer electrolyte layer and the second polymer electrolyte layer according to the present invention are used to form the all-solid battery, it is possible to reduce the interfacial resistance to the movement of the ions across the interface between the electrode active material and the solid electrolyte material, thereby suppressing the reduction in the output.

It is preferable that the first polymer electrolyte layer is disposed facing the negative electrode, the second polymer electrolyte layer is formed thereon, and the positive electrode is formed thereon. If the stacking order of the first and second polymer electrolyte layers is reversed, it is undesirable because the resistance of the battery may increase and thus the discharge capacity may decrease.

Also, it is preferable to use two polymer electrolyte layers having different EO:Li molar ratios of the poly (ethylene oxide)-based polymer and lithium salt, i.e. to simultaneously apply the first polymer electrolyte layer having the molar ratio of EO:Li of the poly (ethylene oxide)-based polymer and the lithium salt of 1:1 to 7:1 and the second polymer electrolyte layer having the molar ratio of EO:Li of poly (ethylene oxide)-based polymer and lithium salt of 8:1 to 30:1. If the first polymer electrolyte layer is out of the above range, it is undesirable because the interfacial resistance may increase and thus the discharge capacity may decrease, and if the second polymer electrolyte layer is out of the above range, it is undesirable because the resistance of the electrolyte-separation membrane layer may increase and thus the discharge capacity may decrease.

The all-solid battery is manufactured through a dry compression process in which electrodes and solid electrolytes are prepared in powder form, then charged into a given mold and then pressed, or a slurry coating process in which a slurry composition including an active material, a solvent, and a binder is prepared, then coated, and then dried. The preparation of the all-solid battery having the above-described composition is not particularly limited in the present invention, and a known method can be used.

As an example, a cell is assembled by placing the solid electrolyte between the positive electrode and the negative electrode, and then compressing and molding them. The assembled cell is installed in the exterior material and then sealed by heat compression or the like. Laminate packs such as aluminum, stainless steel and the like, or cylindrical or square metal containers are very suitable for the exterior material.

The method of coating the electrode slurry on the current collector may include a method of distributing the electrode slurry over the current collector and then uniformly dispersing the slurry using a doctor blade or the like, and methods such as die casting, comma coating, screen printing and the like. Alternatively, the electrode slurry may be bonded to the current collector by pressing or lamination method after forming on a separate substrate. At this time, the thickness of the coating to be finally coated can be adjusted by controlling the concentration of the slurry solution, the number of coatings or the like.

The drying process is a process for removing the solvent and moisture in the slurry in order to dry the slurry coated on the metal current collector, and may be changed depending on the solvent used. As an example, the drying process is carried out in a vacuum oven at 50 to 200° C. The drying method may include, for example, a drying method by warm air, hot air, or low-humidity air, vacuum drying, and a drying method by irradiation with (far-) infrared ray or electron beam. The drying time is not particularly limited, but is usually carried out in the range of 30 seconds to 24 hours.

After the drying process, a cooling process may be further included, and the cooling process may be a process of slowly cooling to room temperature so that the recrystallized structure of the binder is well formed.

Further, if necessary, after the drying process, in order to increase the capacity density of the electrode and increase the adhesion between the current collector and the active materials, a pressing process of passing the electrode between two rolls heated at high temperature and compressing the electrode to a desired thickness can be performed.

The pressing process is not particularly limited in the present invention, and a known pressing process is available. As an example, the pressing process is carried out by passing between rotating rolls or by using a flat press machine.

Hereinafter, the present invention will be described in detail with reference to a preferred embodiment of the present invention and the accompanying drawings. However, it will be apparent to those skilled in the art that the present invention is not limited by the following embodiments and that various changes or modifications can be made within the scope of the technical idea of the present invention.

Hereinafter, n in the expression 'PEO$_n$-lithium salt' represents the number of moles of PEO corresponding to 1 mole of Li of the lithium salt and X in the expression 'PEO$_n$-lithium salt-X' means that it is bridged into a semi-IPN structure.

Preparation of Polymer Electrolyte Membrane

Preparation Example 1

1. PEO (Mw≈4,000,000) and LiFSI were mixed in acetonitrile (AN) at a molar ratio of EO:Li=5:1.
2. 3 μm of a polymer electrolyte membrane, i.e., a PEO$_5$-LiFSI membrane, was prepared by solution casting method using the above solution.

Preparation Example 2

1. PEO (Mw≈4,000,000) and LiFSI were mixed in acetonitrile (AN) at a molar ratio of EO:Li=20:1.

2. 20 μm of a polymer electrolyte membrane, i.e., a PEO$_{20}$-LiFSI membrane, was prepared by solution casting method using the above solution.

Preparation Example 3

1. PEO (Mw≈4,000,000) and LiFSI were mixed in acetonitrile (AN) at a molar ratio of EO:Li=20:1.
2. To this solution, PEGDA (n=10) and initiator BPO (benzoyl peroxide) were mixed in an amount of 10 wt. % of PEO$_{20}$-LiTFSI and then stirred until a homogeneous solution is obtained. At this time, BPO was mixed so as to be 1 wt. % of PEGDA.
3. 20 μm of a polymer electrolyte membrane, i.e., a PEO$_{20}$-LiFSI-X membrane, was prepared by solution casting method using the above mixed solution.

Preparation Example 4

1. PEO (Mw≈4,000,000) and LiFSI were mixed in acetonitrile (AN) at a molar ratio of EO:Li=2:1.
2. 3 μm of a polymer electrolyte membrane, i.e., a PEO$_2$-LiFSI membrane, was prepared by solution casting method using the above solution.

Preparation Example 5

1. PEO (Mw≈4,000,000) and LiFSI were mixed in acetonitrile (AN) at a molar ratio of EO:Li=12:1.
2. 10 μm of a polymer electrolyte membrane, i.e., a PEO$_{12}$-LiFSI membrane, was prepared by solution casting method using the above solution.

Measurement of Ion Conductivity

The ionic conductivities at 60 □ were measured from the responses obtained by placing the electrolyte membranes of Production Example 1 and Preparation Example 2 respectively between electrodes (stainless steel, SUS) and applying an alternating current, while placing two blocking electrodes, using the impedance analyzer (Zahner, IM6). The results are shown in table 1 below.

TABLE 1

|  | Type | Ion conductivity (60° C.) |
|---|---|---|
| Preparation Example 1 | PEO$_5$—LiFSI | $1.3 \times 10^{-4}$ S/cm |
| Preparation Example 2 | PEO$_{20}$—LiFSI | $3.0 \times 10^{-4}$ S/cm |

As shown in table 1, $1.3 \times 10^{-4}$ S/cm which is the ionic conductivity of the PEO$_5$-LiFSI membrane of Preparation Example 1 at 60° C. was confirmed to be much lower than $3.0 \times 10^{-4}$ S/cm which is the ionic conductivity of the PEO$_{20}$-LiFSI membrane of Preparation Example 2. Therefore, it was confirmed that the higher the Li content, the lower the ionic conductivity and it can be predicted that there is a problem in using the PEO$_5$-LiFSI membrane of Preparation Example 1 as a single membrane.

Preparation of Lithium Symmetric Cell

Example 1

Figure 2:
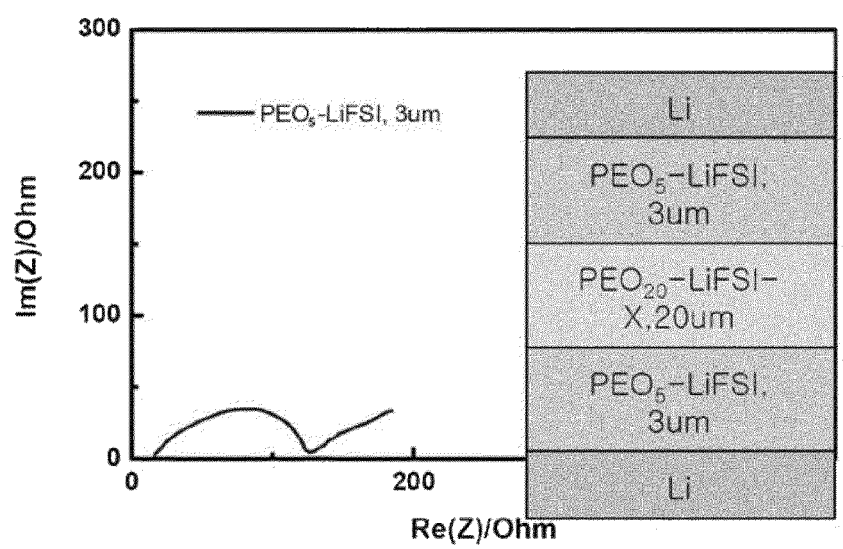
FIG. 2 is a graph showing the interfacial resistance of the lithium symmetric cell according to Example 1.

As shown in FIG. 2, a Li symmetric cell was prepared by applying the PEO$_5$-LiFSI membrane of Preparation Example 1 to the surface of lithium metal and applying the PEO$_{20}$-LiFSI-X membrane of Preparation Example 3 therebetween.

Comparative Example 1

As shown in FIG. 1, a Li symmetric cell was prepared by applying the PEO$_{20}$-LiFSI-X membrane of Preparation Example 3 between lithium metals.

Preparation of All-Solid Battery

Example 2

Figure 3:
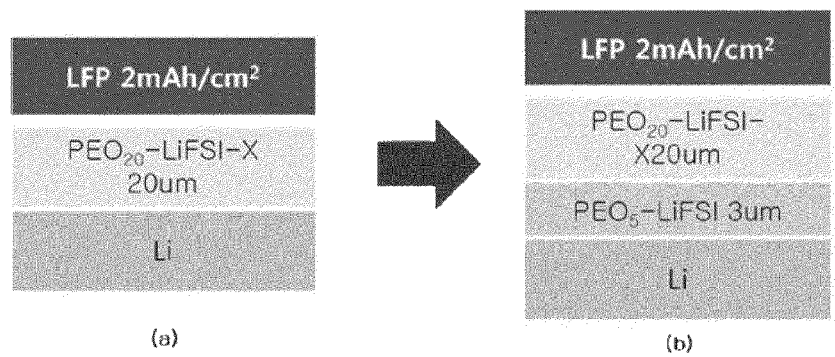
FIG. 3 is a comparative cross-sectional view of the all-solid batteries according to Comparative Examples 2(a) and 2(b).

1. A positive electrode with porosity of 10% or less and loading of 2 mAh/cm$^2$ was prepared with a size of 10.6 cm$^2$ by mixing a LFP (LiFePO$_4$) active material, a conductive material, and a polymer electrolyte.
2. The first polymer electrolyte of PEO$_5$-LiFSI of the above Preparation Example 1 was placed on lithium.
3. The second polymer electrolyte of PEO$_{20}$-LiFSI-X of the above Preparation Example 3 was placed on the first polymer electrolyte.
4. The positive electrode prepared in the above step 1 was superimposed on the second polymer electrolyte to prepare the all-solid battery as shown in FIG. 3b.

Example 3

1. A positive electrode with porosity of 10% or less and loading of 2 mAh/cm$^2$ was prepared with a size of 10.6 cm$^2$ by mixing a LFP (LiFePO$_4$) active material, a conductive material, and a polymer electrolyte.
2. The first polymer electrolyte of PEO$_2$-LiFSI of the above Preparation Example 4 was placed on lithium.
3. The second polymer electrolyte of PEO$_{20}$-LiFSI-X of the above Preparation Example 2 was placed on the first polymer electrolyte.
4. The positive electrode prepared in the above step 1 was superimposed on the second polymer electrolyte to prepare the all-solid battery.

Comparative Example 2

1. A positive electrode with porosity of 10% or less and loading of 2 mAh/cm$^2$ was prepared with a size of 10.6 cm$^2$ by mixing a LFP (LiFePO$_4$) active material, a conductive material, and a polymer electrolyte.
2. PEO$_{20}$-LiFSI-X membrane of the above Preparation Example 3 was placed on lithium.
3. The positive electrode prepared in the above step 1 was superimposed to prepare the all-solid battery as shown in FIG. 3a.

Comparative Example 3

1. A positive electrode with porosity of 10% or less and loading of 2 mAh/cm$^2$ was prepared with a size of 10.6 cm$^2$ by mixing a LFP (LiFePO$_4$) active material, a conductive material, and a polymer electrolyte.
2. The second polymer electrolyte of PEO$_{20}$-LiFSI of the above Preparation Example 2 was placed on lithium.
3. The first polymer electrolyte of PEO$_5$-LiFSI of the above Preparation Example 1 was placed on the second polymer electrolyte.
4. The positive electrode prepared in the above step 1 was superimposed on the first polymer electrolyte to prepare the all-solid battery.

Comparative Example 4

1. A positive electrode with porosity of 10% or less and loading of 2 mAh/cm$^2$ was prepared with a size of 10.6 cm$^2$ by mixing a LFP (LiFePO$_4$) active material, a conductive material, and a polymer electrolyte.

2. The second polymer electrolyte of PEO$_{12}$-LiFSI of Preparation Example 5 was placed on lithium.

3. The second polymer electrolyte of PEO$_{20}$-LiFSI of Preparation Example 2 was placed on the second polymer electrolyte.

4. The positive electrode prepared in the above step 1 was superimposed on the second polymer electrolyte to prepare the all-solid battery.

Measurement of Interfacial Resistance

The resistances of the lithium symmetric cells of Example 1 and Comparative Example 1 and the all-solid batteries of Example 3 and Comparative Examples 3 and 4 were measured by electrochemical impedance spectroscopy (EIS), and the interfacial resistances were confirmed by the points where the semicircular lines in the graph of FIG. 1 and FIG. 2 thus obtained meet the x axis. The interfacial resistances are shown in table 2 below.

TABLE 2

| Item | Symmetric cell | | All-solid battery | | |
|---|---|---|---|---|---|
| | Example 1 | Comparative Example 1 | Example 3 | Comparative Example 3 | Comparative Example 4 |
| interfacial resistance (Ω) | 130 | 350 | 200 | 350 | 2200 |

It was confirmed that the resistance of the cell to which only the PEO$_{20}$-LiFSI-X of Comparative Example 1 was applied, as shown in FIG. 1, is 350Ω, whereas the resistance of the cell to which the PEO$_5$-LiFSI of Example 1 was applied as an interlayer between the PEO$_{20}$-LiFSI-X, as shown in FIG. 2, was greatly reduced to about 130Ω despite the increase in thickness by 6 μm. As a result, it can be seen that the PEO$_5$-LiFSI membrane has a very low interfacial resistance with lithium.

In addition, the resistance of the all-solid battery to which PEO$_2$-LiFSI and PEO$_{20}$-LiFSI were sequentially applied based on lithium negative electrode, which is Example 3, was found to be 200Ω, and the resistance of the all-solid battery to which PEO$_{20}$-LiFSI and PEO$_5$-LiFSI were sequentially applied based on lithium negative electrode, which is Comparative Example 3 in which the positions of the first polymer and the second polymer were changed, was found to be 350Ω, and the resistance of the all-solid battery to which PEO$_{12}$-LiFSI and PEO$_{20}$-LiFSI were sequentially applied based on the lithium negative electrode, which is Comparative Example 4 using only the second polymer, was found to be 2200Ω. As a result, it can be seen that the interfacial resistance of the battery in which the first polymer electrolyte layer is placed facing the lithium based on the lithium negative electrode and the second polymer electrolyte layer is placed on top of it, is lower, and it can be seen that the interfacial resistance of the battery using the first polymer electrolyte layer and the second polymer electrolyte layer at the same time is lower than that of the battery using only the second polymer electrolyte layer.

Measurement of Discharge Capacity

Figure 4:
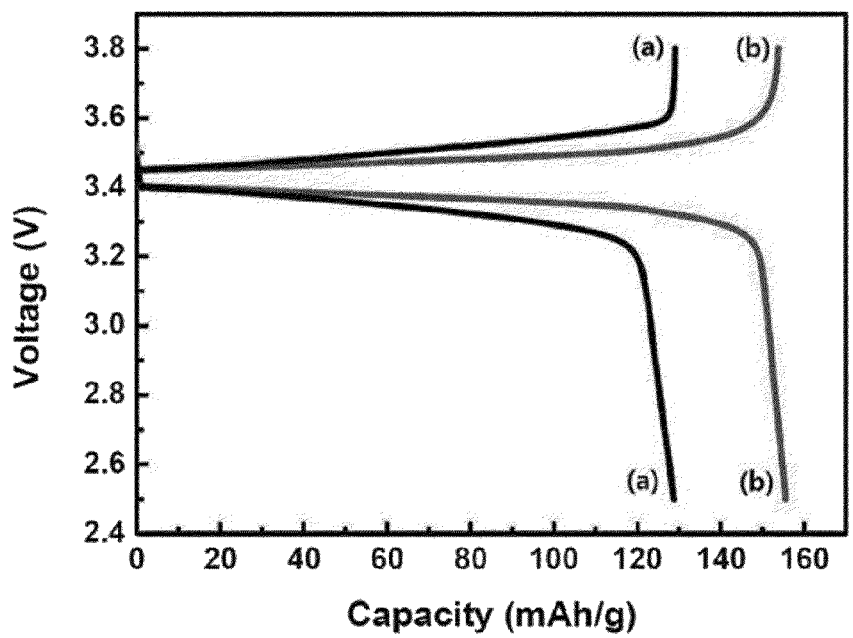
FIG. 4 is a graph comparing the discharge capacities of the all-solid batteries according to Comparative Examples 2(a) and 2(b).

As shown in FIG. 4, in the all-solid battery (Comparative Example 2, (a)) using only PEO$_{20}$-LiFSI-X, the loading of the positive electrode was high and the interfacial resistance with lithium was also high so that the discharge capacity was not sufficiently expressed, which was 130 mAh/g.

However, it was confirmed that in the all-solid battery (Example 2, (b)) of the present invention to which the PEO$_5$-LiFSI polymer electrolyte membrane of the first polymer electrolyte is applied between the lithium negative electrode and the PEO$_{20}$-LiFSI-X of the second polymer electrolyte, the interfacial resistance with lithium is greatly reduced, and thus the discharge overvoltage is reduced and a sufficient discharge capacity of 155 mAh/g is realized. Therefore, when the PEO$_5$—LiFSI polymer electrolyte membrane of the first polymer electrolyte is applied to the battery, output characteristics and energy density can be improved.

The invention claimed is:

1. An all-solid battery, comprising:
    a negative electrode;
    a positive electrode; and
    a polymer electrolyte with a multi-layer structure, comprising:
        a first polymer electrolyte layer having a molar ratio of EO:Li of poly (ethylene oxide)-based polymer and lithium salt of 1:1 to 7:1; and
        a second polymer electrolyte layer having a molar ratio of EO:Li of poly (ethylene oxide)-based polymer and lithium salt of 8:1 to 30:1,
        wherein a stacking order in the all-solid battery is the negative electrode, the first polymer electrolyte layer, the second polymer layer and the positive electrode.

2. The all-solid battery according to claim 1, wherein the thickness of the first polymer electrolyte layer is 1 to 5 μm.

3. The all-solid battery according to claim 1, wherein the thickness of the second polymer electrolyte layer is 5 to 50 μm.

4. The all-solid battery according to claim 1, wherein the weight average molecular weight of the poly (ethylene oxide)-based polymer is 1,000,000 to 8,000,000.

5. The all-solid battery according to claim 1, wherein the lithium salt comprises one selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, LiSCN, LiC(CF$_3$SO$_2$)$_3$, (CF$_3$SO$_2$)$_2$NLi, (FSO$_2$)$_2$NLi, chloroborane lithium, lithium lower aliphatic carboxylate, lithium tetraphenylborate, lithium imide and combinations thereof.

6. The all-solid battery according to claim 1, wherein the second polymer electrolyte layer is crosslinked by a crosslinking monomer to form semi-interpenetrating polymer networks.

7. The all-solid battery according to claim 6, wherein the crosslinking monomer comprises —(CH$_2$—CH$_2$—O)— repeating units.

8. The all-solid battery according to claim 7, wherein the crosslinking monomer contains from two to eight alkylenic unsaturated bonds at terminals.

9. The all-solid battery according to claim 6, wherein the crosslinking monomer is contained in an amount of 5 to 50 wt. % relative to the poly (ethylene oxide)-based polymer and lithium salt.

* * * * *